(No Model.)
2 Sheets—Sheet 1.

C. D. LOOMIS.
BUG EXTERMINATOR.

No. 595,720. Patented Dec. 21, 1897.

Witnesses
Victor J. Evans.
J. C. Tappan

Inventor
Charles D. Loomis.
by John Wedderburn
Attorney (No Model.)

2 Sheets—Sheet 2.

C. D. LOOMIS.
BUG EXTERMINATOR.

No. 595,720.

Patented Dec. 21, 1897.

Witnesses
Victor J. Evans
J. C. Tappan

Inventor
Charles D. Loomis.
by John Wedderburn
Attorney

UNITED STATES PATENT OFFICE.

CHARLES D. LOOMIS, OF AUSTERLITZ, NEW YORK.

BUG-EXTERMINATOR.

SPECIFICATION forming part of Letters Patent No. 595,720, dated December 21, 1897.

Application filed October 29, 1896. Serial No. 610,483. (No model.)

*To all whom it may concern:*

Be it known that I, CHARLES D. LOOMIS, a citizen of the United States, residing at Austerlitz, in the county of Columbia and State of New York, have invented certain new and useful Improvements in Potato-Bug Exterminators with Attachments; and I do hereby declare the following to be a full, clear, and exact description of the invention, such as will enable others skilled in the art to which it appertains to make and use the same.

My invention relates to potato-bug exterminators and a cultivator attachment therefor for the purpose of cleaning bugs and other vermin from vines or stalks and for exterminating the bugs thus cleaned.

To this end the invention consists in the various matters hereinafter described and claimed.

Figure 1:
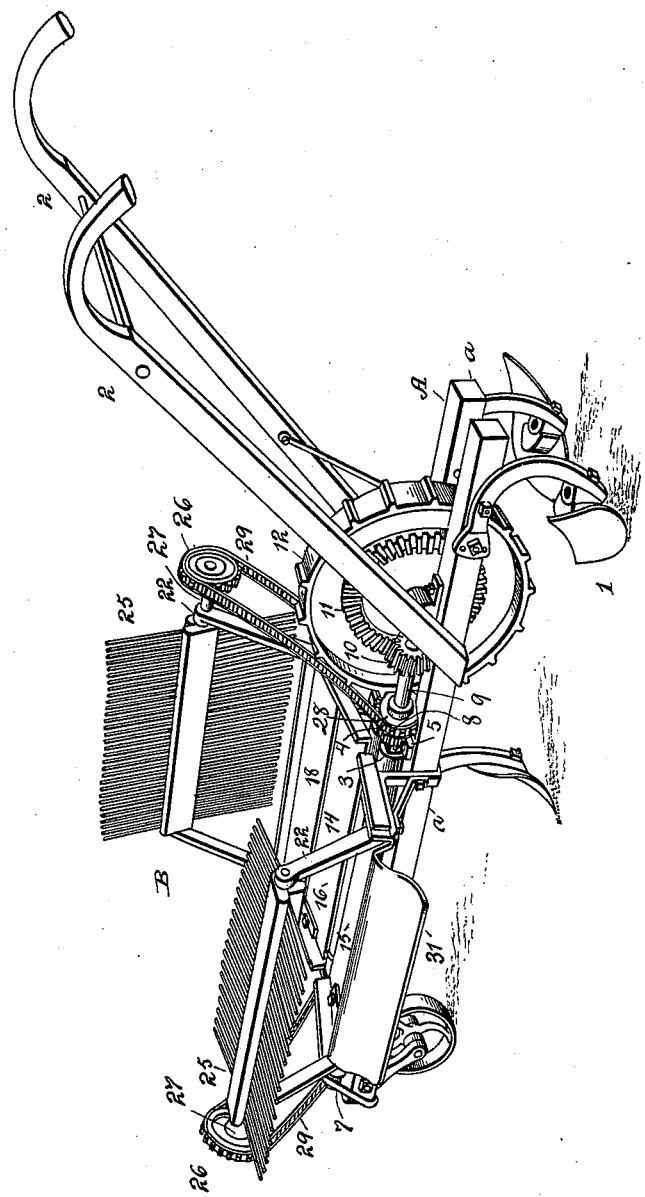
Figure 2:
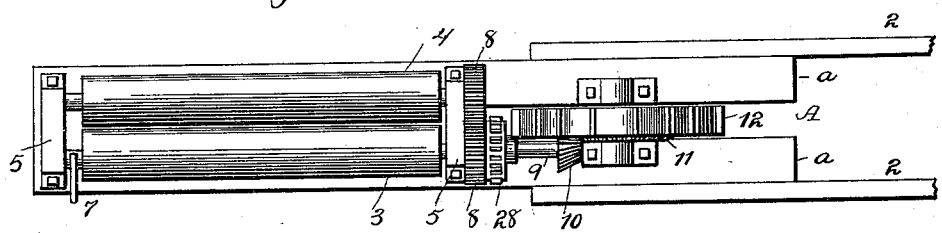
Figure 3:
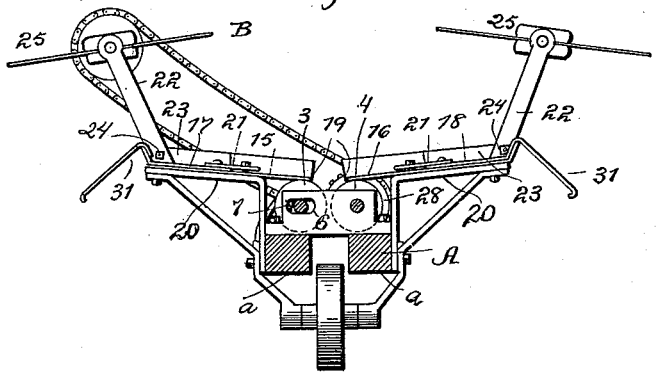
Figure 4:
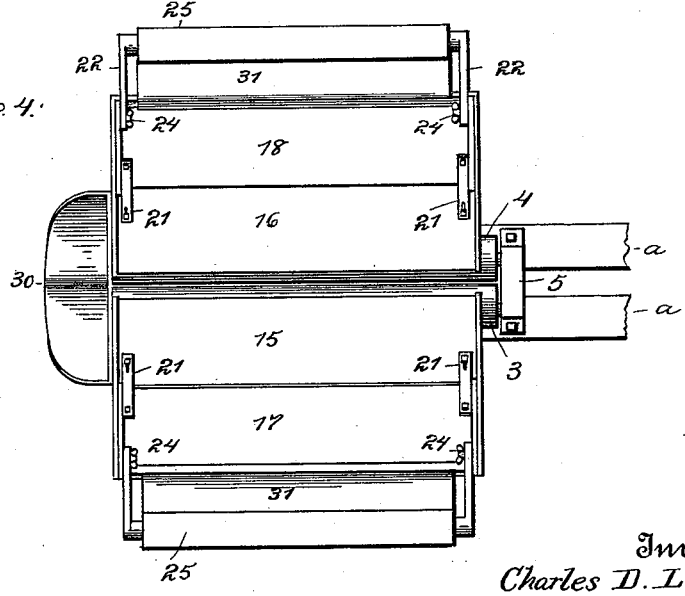

In the accompanying drawings, which illustrate the invention, Figure 1 is a perspective of the exterminator. Fig. 2 is a view with the hopper and its attendant parts removed, showing the location of the rolls upon the exterminator-frame and the connections for operating said roll. Fig. 3 is a cross-section taken just in front of the gears upon the rolls, this figure showing the manner in which the rolls are seated, while the upturned edge of the hopper-plates are removed in order to show the relation of said plates to the rolls. Fig. 4 is a plan view of the hopper. Fig. 5 is an elevation showing the attachment of the arms of the brush-frame to the hopper.

Referring now more particularly to the drawings, A represents the exterminator-frame, and B the exterminator mechanism.

The exterminator-frame comprises side beams $a$, to which the plow-points 1 are attached and from which extend the usual handles 2. To the beams $a$ are attached the exterminator mechanism. This consists, generally speaking, of rolls located upon the frame of the exterminator, a hopper having a discharge-opening above said rolls and brushes or collector-arms attached to said hopper, together with mechanism for rotating the rolls and for rotating the brushes or collectors. The exterminator is designed to be run in the furrow between two rows of plants, and the rotation of the collectors will cause them to scrape said plants, picking the bugs or vermin from them and depositing said bugs or vermin into the hopper, by which they are fed to the rolls and crushed.

Referring now to the details of construction, a roll 3 is journaled longitudinally along one of the beams $a$, and journaled upon the other of said beams is a roll 4, adapted to cooperate with the roll 3 and to crush the vermin. The roll 3 is seated in journal-boxes 5 and has more or less play in slots 6 in said journal-box, the said roll being normally pressed into contact with the roll 3 by means of springs 7, between the journals of the roll and the side of the journal-box. Thus should any stones or dirt be thrown into the hopper and fed to the rolls said rolls can give to accommodate the unusual thickness. The rolls are provided at their rear ends with gears 8, which intermesh so that rotation of one roll will cause corresponding rotation of the other. Upon one of the rolls (here shown as roll 3) the rear journal is extended to form a shaft 9, and upon the end of this shaft is provided a bevel-gear 10, which gear meshes with a corresponding gear 11 upon a wheel 12, journaled between the beams $a$. Thus upon rotation of the wheel 12 motion will be imparted to the rolls 3 4. The wheel is of a diameter such that its circumference will rest upon the ground in the movement of the exterminator, and in order to insure the rotation of the wheel its periphery is provided with suitable teeth 13.

A hopper 14 is attached to the frame over the rolls, said hopper being composed of four plates 15, 16, 17, and 18, the plates 15 and 16 having their inner edges 19 in contact with the rolls in order to clean the same and being supported upon brackets 20, attached to the beams $a$. These plates 15 and 16 lie one upon each side of the rolls. The plates 17 and 18 rest upon the plates 15 and 16 and are adjustably attached thereto, as by means of the slots and set-bolts 21. Arms 22 extend from the upturned edges 23 of the plates 17 and 18, said arms being pivoted to these plates and having means, as a set-screw 24, extending through the arms for locking said arms at any desired inclination. Each set of arms carries a brush or collector 25, by which the bushes or plants are scraped and the bugs deposited into the hopper.

Connections are provided by which the brushes are rotated and, as here shown, these connections comprise sprockets 26, located upon the shafts 27 of the brushes, and sprockets 28 upon the shaft of the roll 3, said sprockets being connected by chains 29 in such a manner as to give the brushes rotation toward the hopper.

A fender 30 is attached to the front of the exterminator-frame, said fender extending to a point quite near the ground and having its sides carried up to near the level of the hopper. Aprons 31 extend over the sides of the hopper, said aprons having their upper edges rounded. Thus any low-lying bushes or vines are caught by the fender and carried up to the aprons, where they are scraped by the brushes, the rounded upper edges of the aprons preventing the bushes from being cut by the hopper edges.

It will thus be seen that by the use of the present improvement with its cultivator attachment the vines can be easily cleaned of bugs, thus obviating the necessity of picking said bugs by hand.

Having thus described my invention, what I claim as new, and desire to secure by Letters Patent, is—

1. A potato-bug exterminator with cultivator attachment comprising rolls having their faces substantially in contact, means for rotating said rolls, and means for collecting and conveying vermin from vines to the rolls, said rolls being yieldingly placed with relation to each other so that the distance between their faces can be varied and a hopper having laterally-adjustable plates carrying collectors, substantially as described.

2. A potato-bug exterminator with cultivator attachment comprising means for exterminating vermin, means for collecting vermin from vines and feeding the same to said exterminating means, the collecting members carried by plates within the hopper and being laterally adjustable, substantially as described.

3. A potato-bug exterminator with cultivator attachment comprising means for exterminating vermin, and means for collecting vermin from vines and feeding the same to the exterminating means, said collecting members carried by plates within the hopper, said members being adjustable both vertically and laterally, substantially as described.

4. A potato-bug exterminator with attachment for cultivators comprising means for exterminating vermin, a hopper above said means, and means upon said hopper for collecting vermin from vines and depositing the same upon the hopper, said collecting mechanism being carried by plates laterally adjustable upon said hopper, substantially as described.

5. A potato-bug exterminator with attachment for cultivators comprising means for exterminating vermin, a hopper above said means, said hopper having plates laterally adjustable thereon, and collectors for the vermin carried by said plates, substantially as described.

6. A potato-bug exterminator with attachment for cultivators comprising means for exterminating vermin, a hopper, collectors for the vermin carried by plates within the hopper and operating over the edges of said hopper, and aprons extending from the edges of the hopper over which the collectors operate, substantially as described.

7. In a potato-bug exterminator with cultivator attachment, a frame composed of beams having a space between them, a roll journaled upon each of said beams, said rolls having their faces in contact or approximately so at a point over the space between the beams, one of said rolls being yieldingly located, the other of said rolls having its shaft extended and provided at its end with a gear, a wheel journaled to rotate in the space between the beams, said wheel being provided with a gear in mesh with the gear upon the roll-shaft, gears between the rolls, brushes journaled in suitable supports upon the frame, sprockets upon said brushes, sprockets upon the shaft of the fixed roll, and chains connecting the sprockets, a hopper having plates adjustable laterally, and collectors for the vermin, carried by said plates, substantially as described.

In testimony whereof I have signed this specification in the presence of two subscribing witnesses.

CHARLES D. LOOMIS.

Witnesses:
WILLIAM C. DALEY,
GEO. L. MORRIS.